United States Patent [19]

Wise

[11] Patent Number: 4,651,074

[45] Date of Patent: Mar. 17, 1987

[54] ROBOTIC SENSOR

[76] Inventor: James A. Wise, 1055 Goodman Ranch Rd., Garberville, Calif. 95440

[21] Appl. No.: 678,170

[22] Filed: Dec. 4, 1984

[51] Int. Cl.$^4$ .......................... G05B 1/00; G05B 19/00
[52] U.S. Cl. .................................. 318/640; 318/568; 318/480; 901/47
[58] Field of Search .......................... 901/46, 47, 9, 10; 318/640, 567, 568, 480; 250/227, 231 R

[56] References Cited

U.S. PATENT DOCUMENTS

| | | | |
|---|---|---|---|
| 4,359,637 | 11/1982 | Perreu | 250/227 |
| 4,368,430 | 1/1983 | Dale | 250/227 X |
| 4,384,203 | 5/1983 | Wells | 250/227 |
| 4,401,945 | 8/1983 | Juengel | 901/10 X |
| 4,414,471 | 11/1983 | Rines | 250/227 |
| 4,419,895 | 12/1983 | Fuller | 250/227 X |
| 4,441,817 | 4/1984 | Pryor | 901/47 X |
| 4,449,084 | 5/1984 | Meno | 318/640 |
| 4,471,219 | 9/1984 | Giallorenzi | 250/227 |
| 4,477,724 | 10/1984 | Harmer | 250/227 |

FOREIGN PATENT DOCUMENTS

| | | | |
|---|---|---|---|
| 0044245 | 1/1982 | France | 901/47 |
| 1470351 | 4/1977 | United Kingdom . | |
| 1470352 | 4/1977 | United Kingdom | 901/47 |

Primary Examiner—William M. Shoop, Jr.
Assistant Examiner—Patrick C. Keane
Attorney, Agent, or Firm—Flehr, Hohbach, Test, Albritton & Herbert

[57] ABSTRACT

A robotic sensor incorporates an array of closely spaced force sensors which are carried on a mounting plate. The front surface of this mounting plate is brought into contact with the object under inspection. A plurality of optical fibers are attached to the rear one end; the opposite ends of the fibers are connected to optical detectors. Actuation of any of the force end of the force sensor to impinge on and reduce the light flow through a corresponding optical fiber. Analysis of the data indicating which of the optical fibers and their light output reduced will result in an analysis of the dimensions and orientation of the object.

7 Claims, 3 Drawing Figures

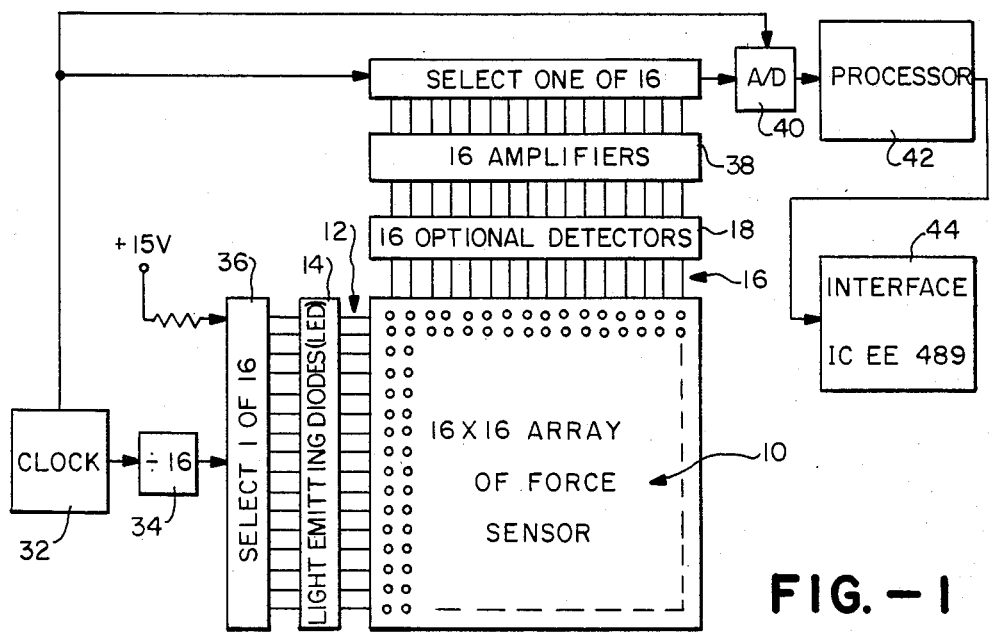
FIG.—1
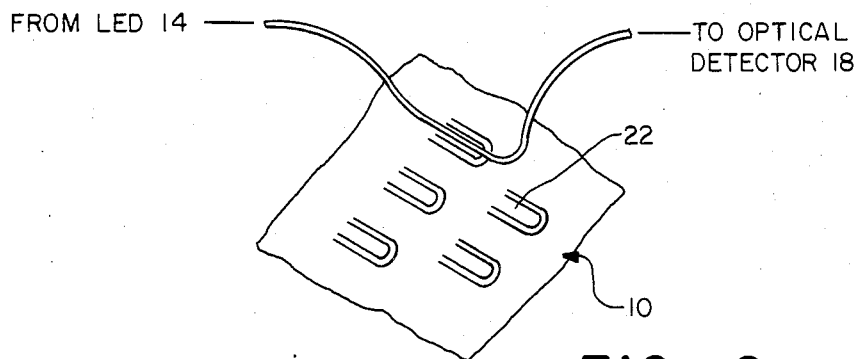
FIG.—2
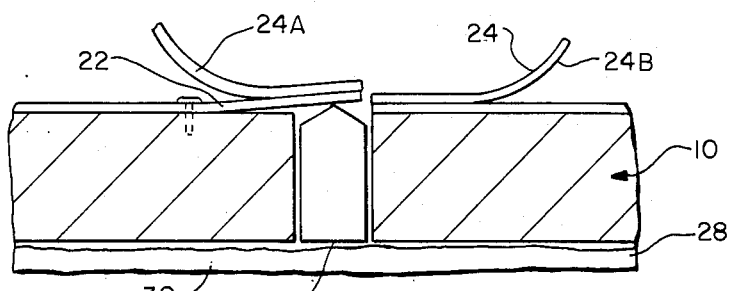
FIG.—3

ROBOTIC SENSOR

Generally speaking, this invention relates to the field of robotic manipulators, and more particularly to a sensor for determining the size, location and other parameters of an object which may then be grasped or moved by an end effector on a robot arm.

The use of computer-controlled robots is becoming increasingly widespread in industry. Once their initial purchase cose has been amortized, experience has shown that robots are less expensive to operate and considerably more reliable than the human operators they replace, especially in repetitive assembly applications where human judgment is not a critical factor.

A typical robot arm will comprise two or more arm sections operatively connected by computer controlled joints. Connections between these sections may be analogized, for example, to the human shoulder, elbow and wrist joints. A "hand" or end effector is typically attached to the extremity of the arm to manipulate a workpiece or object as required by the particular task to be performed.

For such an arm to be useful, it is of course necessary to be able to move the arm so that the hand can pick up, manipulate and set down the workpiece. Typically, this has been accomplished by "training" the robot arm to move through a given set of coordinates, i.e., by noting the coordinates of the beginning and end positions of the hand and then computing the precise angles through which each joint must be rotated so that the hand reaches the desired end position.

However, as robots are used for more tasks, especially tasks incorporating the manipulation, grasping or assembly of objects, means are required for modifying the end position of the hand or the operation of the end effector based on the size, weight or position of the workpiece. This is especially necessary in working, for example, with objects moving on conveyors or small objects which are placed in trays or the like. With objects moving on conveyors, the object or workpiece to be grasped is not always oriented in the same way. With objects on conveyors or pluralities of objects in trays, different objects may frequently appear closely adjacent to one another, and some means of identifying or sorting between different objects is necessary. Moreover, for more automated training of the robot hand and arm, some sort of electronic system for conveying the size, shape and orientation of a workpiece to the computer controlling the robot is much more desirable than the use of human feedback on these parameters.

Therefore, it is an object of the present invention to provide a tactile sensor for a robot.

Further, it is an objecion of the present invention to provide a tactile sensor which conveys accurate information about the size, shape, orientation and other features of the workpiece.

Another objective of the present invention is to provide a tactile sensor which operates at relatively high speed so that it may potentially be useful in concurrently adjusting the positioning or force applied by an end effector which is to grasp the object being sensed. Another objective of the present invention is to provide a tactile sensor which has a relatively closely-spaced array of sensors so that accurate information can be developed about the shape and orientation of the object.

Yet another objective of the present invention is to provide a tactile sensor which is relatively inexpensive and capable of being easily interfaced with the types of small scale computers which are typically used for robot control systems.

Yet another objective of the present invention is to provide a tactile sensor which is capable of a long life in manufacturing environments.

These and other objectives of the present invention are met by a robotic sensor which incorporates an array of closely spaced force sensors carried on a mounting plate. The front surface of this mounting plate is brought into contact with the object under inspection. A plurality of optical fibers are attached to the rear of this mounting plate. The fibers are illuminated from one end; the opposite ends of the fibers are connected to optical detectors. Actuation of any of the force sensors by contact with the object causes the opposite end of the force sensor to impinge on and reduce the light flow through a corresponding optical fiber. Analysis of the date indicting which of the optical fibers had their light output reduced will result in an analysis of the dimensions and orientation of the object.

In the preferred embodiment of the invention, the force sensors comprise an array of pins which are held within holes in the mounting plate by a flexible membrane which extends across the confronting surface of the mounting plate. On the rear surface, cantilevered flexible spring metal fingers extend across the rear of each pin and an optical fiber is bonded to this finger. A narrow slit is cut completely through the optical fiber adjacent the end of the finger, so that while the ends of the fibers are normally aligned across the slit; movement of a finger will cut off the light passing between the ends of the optical fiber. Thus, reduction in transmitted light can be detected and stored as an indication of a dimension of the object.

Other objects and advantages of the present invention will become apparent from the following description of an preferred embodiment. The scope of the present invention is not limited to this preferred embodiment, but only by the following claims. The preferred embodiment of the invention is illustrated in the following figures:

FIG. 1 is a block diagram of the sensor array and peripheral electronics which are utilized to illuminate the fibers and detect their output;

FIG. 2 is a perspective view of a portion of the rear surface of the mounting board showing the force actuated fingers and the position of an optical fiber relative to one of the fingers;

FIG. 3 is an expanded view of a portion of one of the figures shown in perspective view in FIG. 2 showing the mounting board, the actuator pin, and the relative movement of the severed ends of the fiber optics upon actuation of the pin by contact with the object under study.

This tactile sensor is useful with robots as already known in the art, such as are shown in U. S. Pat. Nos. 4,283,764 (Krum) or 4,221,997 (Fleming), both of which are incorporated herein by reference. The design of such robot does not constitute a part of this invention.

Turning to FIG. 1, the array of force sensors which in actual use would be mounted for example where the hand of a robot arm is normally found is mounted on a mounting plate 10. An optical fiber 24 is coupled or attached to the mounting plate 10 in close proximity to the force sensor. Fiber bundles 12 run from the edge of the mounting board 10 to the light-emitting diodes 14 which are used to illuminate the optical fibers. An equal number of bundles of optical fibers 16 are brought out from the edge of the board to optical detectors 18. In this example which utilizes a 16×16 array of sensors, 16 fiber bundles must be provided, one for each row of sensors. Each bundle 12 comprises 16 separate optical fibers, one of which goes to each sensor in a given column.

The mounting of a single optical fiber relative to the mounting plate 10 is shown in FIG. 2. FIG. 2 shows the mounting plate 10 having a plurality of flexible metal fingers 22. Attached to the top surface of each finger is one optical fiber 24. It can be seen that each fiber is illuminated from a light source; in this embodiment, it comprises and LED 14. Flexion of the finger 22 will impact on the optical fiber 24 and reduce or prevent transmission of the light from the light source to the optical detector 18. Thus, the presence of an object adjacent the actuator that moves a finger is sensed.

This mechanical reaction is shown more clearly in FIG. 3 which illustrates that the optical fiber in fact is slit into two separate segments 24a, 24b. The force sensor comprises an actuator pin 26. The pin rests in a slot in the mounting plate and is held in place by a flexible cover 28 which may be rubber or plastic. The spring plate 22 which is cantilevered over the mounting slot for the actuator pin holds in the actuator pin from the other side of the mounting plate. This spring plate is made of spring steel or beryllium copper sheeting for long life and consistent return to its home position.

The slit between the segments 24a, 24b of the optical fiber preferably is located adjacent the opposite edge of the actuator pin mounting hole. When the actuator pin 26 is at rest, then the ends of the optical fiber segments are aligned, and light from the light-emitting diode 14 passes through the diode to the detector. Actuation of the pin impinges on the optical fiber segment 24a which is carried by or bonded to the candilevered finger 22. The light from the light-emitting diode now cannot travel through the fiber.

It has been found that this system works well and consistently with an optical fiber of approximately 0.01 inch diameter and utilizing a cantilevered metal finger which has a width of about 0.02 inch.

In operation of the sensor array, the confronting face 30 of the mounting plate is moved up to the object. The LEDs 14 are now successively actuated using a clock pulse from clock 32 (FIG. 1) which, divided by 16 at divider 34 causes a one-of-16 selector 36 to turn on one of the LEDs 14. One LED is provided for each bundle of optical fibers; each fiber in a bundle is connected to a cantilevered finger in the same row but a separate column. The outgoing side of the optical fiber is in turn connected to an optical detector. While the pulsed LED is on, the 16 optical sensors 18, one of which is connected to each column, are scanned. Their amplified voltage outputs taken from amplifiers 38 are digitized 40 and processed 42 to determine the data which defines the essential dimensions of the object. This processed data can then be transmitted through a standard interface 44 for use in positioning the robot.

The above is a description only of a preferred embodiment of the invention. It is believed that the use of optical fibers in this embodiment is especially significant in providing accurate data output in a lightweight, highly responsive tactile sensor. The use of the cantilevered metal fingers has been found to provide a useful, reliable and highly responsive design.

Alternative embodiments of the present invention may become apparent to a person of skill in the art who studies the above invention disclosure. Therefore, the scope of the present invention is to be limited only by the following claims.

What is claimed:

1. A sensor for use in combination with a robotic hand to determine the size and position of an object relative to said hand comprising an array of force responsive sensors arranged in rows and columns on a mounting plate movable with said hand to contact the object,
    said force responsive sensors comprising an array of actuator pins on the surface of said sensor mounting plate confronting said object, a plurality of flexible spring fingers on the rear surface of said mounting plate, an optical fiber cooperating with each of said sensors comprising a pair of longitudinally separated, normally aligned segments to pass the light from a light source through the length of the fiber, one segment of each of said fibers lying across the back of each of said fingers, the other segment of each said fiber being fixed to the rear of said mounting plate, the fiber separation being in the region adjacent the actutable pin, one of said pins being aligned with each of said fingers carrying one of said optical fiber segments, actuation of said in moving said finger and said optical fiber segment to displace said first segment out of alignment with said second segment to diminish the light passing through said fibers, means for selectively interrogating said fiber optic devices while said sensor array is in contact with said object, and means coupled to said interrogating means and responsive to differences in the light output of said second fiber optic segment to determine contact between said object and said sensors.

2. A sensor as claimed in claim 1 wherein including a light source for illuminating said optical fibers, a portion of each of said fibers lying on the rear surface of said mounting plate, actuation of one of said pins impacting on the aligned fiber and reducing the light passing through said fiber.

3. A sensor as claimed in claim 2 wherein each of said fingers is cantilevered over a mounting hole of one of said actuator pins, the separation between said optical fiber segments being aligned with the opposite edge of said mounting hole.

4. A sensor for use in combination with a robot to determine the dimensions or location of an object comprising means for mounting an array of force responsive sensors arranged in rows and columns, said mounting means being movable into contact with an object and having a confronting surface facing said object,
    an array of optical fibers supported on said mounting means, each of said sensors having at least one of said fibers aligned therewith,
    means for transmitting light at a fixed level through said fibers,
    means for detecting changes in the light level conveyed through any of said fibers in response to actuation of said force responsive sensors, and
    a plurality of flexible spring fingers mounted on said mounting means, each finger supporting a short length of one of said optical fibers, each of said fibers comprising a pair of longitudinally separated, normally aligned segments to pass the light from the light source through the length of the fiber, said force responsive sensors comprising an array of actuator pins mounted perpendicular to and aligned with said fingers, said pins being movable in response to impact with said object to displace said fingers, said fingers being movable in response to said sensors to move one of said segments out of alignment with the other of said segments to modify the amount of light passing through said supported optical fiber to said detecting means, actuation of said force responsive sensors moving said fingers and thereby one of said normally aligned segments.

5. A sensor as claimed in claim 4 wherein said mounting means comprise a plate having slots for said pins, each of said fingers being cantilevered from the edge of one of said slots over at least one of said pins.

6. A sensor as claimed in claim 5 wherein the separation between said optical fiber segments is aligned with the opposite edge of said mounting hole from said cantilevered finger.

7. A sensor as claimed in claim 6 further comprising a flexible cover over the confronting face of said mounting plate and the ends of said actuatable pins to retain said pins in said slots, the opposite ends of said pins being restrained by said actuatable fingers.

* * * * *